United States Patent Office 3,442,947
Patented May 6, 1969

1

3,442,947
PROCESS FOR PREPARING CARBODIIMIDES
Alwyn G. Davies, London, England, assignor to M & T Chemicals Inc., New York, N.Y., a corporation of Delaware
No Drawing. Filed Jan. 24, 1966, Ser. No. 522,387
Int. Cl. C07c 125/02; C07f 7/22
U.S. Cl. 265—66                                    10 Claims

ABSTRACT OF THE DISCLOSURE

In accordance with certain of its aspects, the process of this invention for preparing organic carbodiimides comprises reacting bis(triorganotin) oxide, $(R_3Sn)_2O$, wherein R is a hydrocarbon group with at least an equimolar amount of organic isothiocyanate thereby forming organic carbodiimide containing the organic group of said organic isothiocyanate; and recovering said organic carbodiimide.

---

This invention relates to a novel process for preparing carbodiimides.

Carbodiimides are organic compounds having the structure R'—N=C=N—R' wherein each of the R' groups is an organic group having a carbon atom bonded to one of the nitrogen atoms of the formula. They are reactive compounds which may find use as catalysts for converting alcohols and acids to esters, for converting acids and amines to amides, and as intermediates for preparing isourea ethers, guanidines, and ureas.

The uses of carbodiimides have been limited by the lack of a convenient method for preparing them. In particular, the unsymmetrical carbodiimides, i.e. those wherein the R' groups are different from each other, have been particularly difficult to prepare.

It is an object of this invention to provide a novel process for preparing carbodiimides, including unsymmetrical carbodiimides. Other objects will be apparent to those skilled-in-the-art from the following description.

In accordance with certain of its aspects, the process of this invention for preparing organic carbodiimides comprises reacting bis (triorganotin) oxide, $(R_3Sn)_2O$, wherein R is a hydrocarbon group with at least an equimolar amount of organic isothiocyanate thereby forming organic carbodiimide containing the organic group of said organic isothiocyanate; and recovering said organic carbodiimide.

In accordance with certain of the preferred aspects of this invention an organic isocyanate may also be employed in the above reaction. In this aspect of the invention organic carbodiimides may be prepared by a process comprising reacting organic isocyanate with at least an equimolar amount of bis (triorganotin) oxide, $(R_3Sn)_2O$ wherein R is a hydrocarbon group thereby forming bis (triorganotin) oxide-isocyanate adduct; reacting said bis (triorganotin) oxide-isocyanate adduct with at least about an equimolar amount of organic isothiocyanate thereby forming organic carbodiimide containing the organic groups of said organic isocyanate and of said organic isothiocyanate; and recovering said organic carbodiimide.

The organic carbodiimides prepared by the process of this invention may have the formula R'—N=C=N—R' wherein each of R' is an organic group having a carbon atom bonded to one of the nitrogen atoms. Typically, R'

2 may be selected from the group consisting of alkyl, aryl, and alkenyl. For example, R' may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, octadecyl, cyclopentyl, cycloheptyl, cyclohexyl, cyclooctyl, etc. R' may be aryl, including penyl, naphthyl, anthryl, phenanthryl, etc. It may be alkenyl, including vinyl, 1-propenyl, methallyl, buten-2-yl, buten-3-yl, penten-1-yl, hexenyl, heptenyl, octenyl, decenyl, dodecenyl, tetradecenyl, ocadecenyl, etc. R' may also be inertly substituted radicals of the type hereinbefore described. Typical inert substituents which may be present include alkyl, aryl, cycloalkyl, aralkyl, alkaryl, alkenyl, ether, halogen, etc. Typical substituted alkyls include 3-chloropropyl, 2-ethoxyethyl, benzyl, 4-methylcyclohexyl, 4-chlorocyclohexyl, β-phenylethyl, etc. Typical inertly substituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl. Each of the R' groups need not be the same. Preferably, one or both of the R' groups may be phenyl, naphthyl, or lower alkyl, i.e. alkyl containing less than about 10 carbon atoms.

In accordance with this invention symmetrical carbodiimides may be prepared the process described supra involving reacting bis (triorganotin) oxide with organic isothiocyanate, including the process comprising reacting bis(triorganotin) oxide with organic isocyanate to form adduct and reacting the adduct with organic isothiocyanate, the organic groups of the isocyanate and the isothiocyanate being the same. Unsymmetrical carbodiimides may be prepared by the processes including reacting bis-(triorganotin) oxide with two different organic isothiocyanates or with organic isocyanate to form adduct and reacting the adduct with organic isothiocyanate, the organic groups of the isocyanate and the isothiocyanate being different.

Illustrative organic carbodiimides which may be prepared by the process of this invention include diphenyl carbodiimide; dicyclohexyl carbodiimide; diallyl carbodiimide; dibenzyl carbodiimide; bis (p-chlorophenyl) carbodiimide; bis (p-bromophenyl) carbodiimide; bis (2-bromoallyl)carbodiimide; bis (p-dimethylaminophenyl) carbodiimide; bis (p-methoxyphenyl) carbodiimide; diethyl carbodiimide; di-1-phenanthryl carbodiimide; di-p-tolyl carbodiimide; didodecyl carbodiimide; di-sec-butyl carbodiimide; bis (4-biphenyl) carbodiimide; tert-butyl methyl carbodiimide; cyclohexyl phenyl carbodiimide; ethyl phenyl carbondiimide; phenyl 1-naphthyl carbodiimide; allyl ethyl carbodiimide; allyl n-octyl carbodiimide; allyl phenyl carbodiimide; benzyl phenyl carbodiimide; etc.

In accordance with the invention, a bis (triorganotin) oxide $(R_3Sn)_2O$ wherein R is a hydrocarbon group may be reacted with an organic isothiocyanate or with both an organic isocyanate and an organic isothiocyanate to form an organic carbodiimide. The bis (triorganotin) oxide may typically have the formula $(R_3Sn)_2O$ wherein R is a hydrocarbon selected from the group consisting of alkyl, aryl, and alkenyl. For example, R may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, tetradecyl, octadecyl, cyclopentyl, cyclohexyl, cycloheptyl, cyclooctyl, etc. R may be aryl, including phenyl, naphthyl, anthryl, penanthryl, etc. R may be alkenyl, including vinyl, allyl, 1-propenyl, methallyl, buten-2-yl, buten-3-yl, penten-1-yl, hexenyl, heptenyl, octenyl, decenyl, dodecenyl, tetradecenyl, octadecenyl, etc. R may also be an inertly substituted radical of the type hereinbefore described. Typical inert substituents which may be present include alkyl, aryl, cycloalkyl, aralkyl, alkaryl, alkenyl, ether, halogen, etc. Typical substituted alkyls include 3-chloropropyl, 2-ethoxypropyl, 4-methylcyclohexyl, 4-chlorocyclohexyl, β-phenylpropyl, etc. Typical inertly substituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl. All of the R groups need not be the same. Preferably, R may be phenyl or lower alkyl, i.e. alkyl containing less than about 10 carbon atoms. Most preferably, R may be butyl.

Illustrative preferred bis (triorganotin) oxides include bis (triethyltin) oxide; bis (tri - n - propyltin) oxide; bis (triisopropyltin) oxide; bis (tri - n - butyltin) oxide; bis (tri - sec - butyltin) oxide; bis (tri - n - octyltin) oxide; bis (tricyclohexyltin) oxide; bis (triphenyltin) oxide; bis (tribenzyltin) oxide; bis (triallyltin) oxide; bis (tri-p-chlorophenyltin) oxide; etc.

The organic isothiocyanates may typically be an organic isothiocyanate of the formula R'NCS wherein R' is as described supra. Illustrative organic isothiocyanates include methyl isothiocyanate; ethyl isothiocyanate; n-propyl isothiocyanate; isopropyl isothiocyanate; n-butyl isothiocyanate; sec-butyl isothiocyanate; dodecyl isothiocyanate; allyl isothiocyanate; phenyl isothiocyanate; 1-naphthylisothiocyanate; 1 - phenanthryl isothiocyanate; p - tolylisothiocyanate; cyclohexyl isothiocyanate; benzyl isothiocyanate; 4 - biphenylylisothiocyanate; p - chlorophenylisothiocyanate; etc.

The reaction between the bis (triorganotin) oxide and the organic isothiocyanate may take place in accordance with Equation I to give a carbodiimide.

(I)

$$2R'NCS + 2(R_3Sn)_2O \rightarrow R'-N=C=N-R' + CO_2 + 2(R_3Sn)_2S$$

R and R' in this equation may be as described supra. When one isothiocyanate is employed, symmetrical carbodiimide may be formed. When two different isothiocyanates are employed, unsymmetrical carbodiimide may be formed. The reaction may proceed through two steps including the formation of a bis (triorganotin) oxide-isocyanate adduct in Equation II and formation of a carbodiimide in Equation III.

(II) $2(R_3Sn)_2O + R'NCS \longrightarrow$
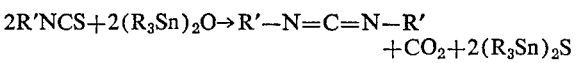
$R_3Sn-N-C-O-SnR_3 + (R_3SnS_2)$ (III) 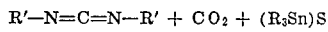 $R_3Sn-N-C-OSnR_3 + R'NCS \longrightarrow$
$R'-N=C=N-R' + CO_2 + (R_3Sn)S$ It is preferred that at least an equimolar amount, and typically a 0%–50% excess, say 0%–20% excess, of organic isothiocyanate be reacted with bis (triorganotin) oxide. The reaction may readily proceed at about 0°–150° C., say 100° C., for about 15 minutes to 20 hours, say 7 hours.

The organic isocyanate which may be employed in accordance with certain preferred aspects of this invention may typically be an organic monoisocyanate of the formula R'NCO wherein R' is as described supra. Illustrative organic isocyanates include methyl isocyanate; ethyl isocyanate; n - propyl isocyanate; isopropyl isocyanate; n - butyl isocyanate; sec - butyl isocyanate; dodecyl isocyanate; phenyl isocyanate; 1 - naphthyl isocyanate; 1 - phenanthryl isocyanate; p - tolyl isocyanate; cyclohexyl isocyanate; benzyl isocyanate; 4 - biphenylylisocyanate; p - chlorophenyl isocyanate; etc.

The reaction between the bis (triorganotin) oxide, the organic isocyanate and the organic isothiocyanate may take place in accordance with Equation III to give a carbodiimide.

(IV)

$$(R_3Sn)O + R'NCO + R'NCS \rightarrow R'-N=C-N-R' + CO_2 + (R_3Sn)_2S$$

R and R' in this equation may be as described supra and each R' group may be the same or different. The reaction may proceed through two steps including the formation of bis (triorganotin) oxide-isocyanate adduct, followed by the formation of a carbodiimide.

The reaction between the bis (triorganotin) oxide and the organic isocyanate may take place in accordance with equation V to give a bis (triorganotin) oxide-isocyanate adduct.

(V) $(R_3Sn)_2O + R'NCO \longrightarrow$ 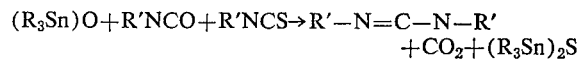 $R_3Sn-N-C-OSnR_3$

It is preferred that the amount of bis (triorganotin) oxide employed be at least about one mole per mole of organic isocyanate, and excess oxide, typically up to about 20% excess may be employed. Most preferably, the bis (triorganotin) oxide and organic isocyanate may be reacted together in substantially equimolar quantities. The reaction typically proceeds smoothly and readily at a reaction temperature of about 0°–100° C., say 25° C. Reaction time may typically be of the order of about 1 minute to 24 hours, preferably 1–10 minutes.

Reaction may be effected by mixing together the bis (triorganotin) oxide and the organic isocyanate. If desired, the isocyanate may be added incrementally to the bis (triorganotin) oxide. The reaction may, if desired, be carried out in an inert solvent which may improve heat transfer, facilitate control, provide fluidity, etc. Suitable inert solvents include organic ethers such as ethyl ether, butyl ether, tetrahydrofuran, 2-methyltetrahydrofuran, tetrahydrofurfuryl ethyl ether, carbon tetrachloride, etc; and hydrocarbon solvents such as benzene, toluene, xylene, petroleum ether or light petroleum including pentane, hexane, heptane, ligroin, etc. Mixtures of two or more solvents may be employed if desired. When an inert solvent is employed, it may typically be present in the amount of about 50–500 ml., preferably 100–250 ml., per mole of organic isocyanate.

In accordance with this aspect of this invention, the bis (triorganotin) oxide-isocyanate adduct may be heated in the presence of organic isothiocyanate 'R'NCS thereby forming bis (triorganotin) sulfide, carbon dioxide, and organic carbodiimide.

The reaction between the bis (triorganotin) oxide-isocyanate adduct and the organic isothiocyanate may be:

(VI) 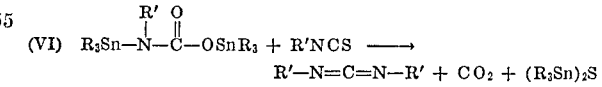 $R_3Sn-N-C-OSnR_3 + R'NCS \longrightarrow$
$R'-N=C=N-R' + CO_2 + (R_3Sn)_2S$ As may be seen from Equations V and VI, the product carbodiimide contains one organic group R' derived from the organic isocyanate and a second organic group R' derived from the organic isothiocyanate. When these groups are identical the carbodiimide will be a symmetrical monomeric carbodiimide, and when they are not identical, unsymmetrical monomeric carbodiimides may be isolated in accordance with this invention. The process of this invention is especially advantageous in the preparation of unsymmetrical carbodiimides.

Typically, it may not be necessary to isolate or purify the bis (triorganotin) oxide-isocyanate adduct prior to heating it in the presence of the organic isothiocyanate. Typically, the organic isothiocyanate may be added to the bis (triorganotin) oxide-isocyanate adduct, i.e. the reaction product of Equation V, supra, and the so-formed mixture may be heated to a temperature of about 25–150°

C., preferably 50–120° C. The amount of organic isothiocyanate added may typically be at least about one mole per mole of bis (triorganotin) oxide-isocyanate adduct, but excess of isothiocyanate, typically up to about 20% excess may be employed. Preferably, the bis (triorganotin) oxide and the adduct may be reacted together in substantially equimolar quantities. The reaction may be carried out in an inert solvent such as those hereinbefore described.

When the bis (triorganotin) oxide-isocyanate adduct is heated in the presence of the organic isothiocyanate, the product carbodiimide is formed together with bis (triorganotin) sulfide, and carbon dioxide is evolved. Completion of the reaction may be indicated by the cessation of carbon dioxide evolution. Typically, the reaction may be complete in about 10 minutes–7 hours, say 3 hours. The reaction may also be observed to take place at room temperature, gradually over a period of weeks.

When reaction is complete, the inert solvent, if present, may be stripped off, preferably under reduced pressure. The product carbodiimide may then be separated from the bis (triorganotin) sulfide by distillation at reduced pressure, preferably less than 0.1 mm. of mercury.

Practice of specific embodiments of this invention may be observed from the following illustrative examples.

Example 1.—Preparation of diphenyl carbodiimide

One molecular proportion of phenyl isocyanate may be added to one molecular proportion of bis (tributyltin) oxide. The reaction may proceed at 20° C. for a period of 5 minutes thereby forming a stoichiometric amount N,O-bis-(tributyltin)-N-phenyl carbamate.

One molecular proportion of phenyl isothiocyanate may be added to the thus produced N,O-bis (tributyltin) N-phenyl carbamate and the mixture allowed to stand over a period of 5 weeks. Observation of infrared spectra of the mixture may indicate the presence of reaction as the carbamate and isothiocyanate bands decrease and a carbodiimide band is formed. The reaction may be accelerated by heating under reflux at 100°–120° C. and 17 mm. pressure for 2 hours. Diphenyl carbodiimide may be recovered by distillation in 30% yield and observed to have a boiling point of 77°–78° C. at 0.01 mm. pressure.

Example 2.—Preparation of ethyl phenyl carbodiimide

One molecular proportion of ethyl isocyanate may be added to one molecular proportion of bis (tributyltin) oxide. The reaction may proceed at 20° C. for a period of 5 minutes thereby forming a stoichiometric amount of N,O-bis-(tributyltin)-N-ethyl carbamate.

One molecular proportion of phenyl isothiocyanate may be added to the thus produced N,O-bis (tributyltin)-N-ethyl carbamate and the mixture heated under reflux at 55°–60° C. and 16 mm. pressure for 6.5 hours, at which point reaction may be observed to have taken place through evolution of carbon dioxide gas. The reaction mixture may be cooled to 0° C. for 3 days and then reheated under reflux at 95°–100° C. at 15 mm. pressure for 3 hours. Ethyl phenyl carbodiimide may be recovered by distillation in 40% yield and found to have a boiling point of 43° C. at 0.05 mm. pressure.

Example 3.—Preparation of allyl ethyl carbodiimide

One molecular proportion of ethyl isocyanate may be added to one molecular proportion of bis (tributyltin) oxide. The reaction may proceed at 20° C. for a period of 5 minutes thereby forming a stoichiometric amount of N,O-bis (tributyltin)N-ethyl carbamate.

1.1 molecular proportions of allyl isothiocyanate may be added to the thus produced N,O-bis (tributyltin)-N-ethyl carbamate and the reaction heated under reflux at 95°–100° C. and 85–90 mm. pressure for 6.5 hours. Crude allyl ethyl carbodiimide may be recovered by distillation in 66% yield from a cold trap.

The crude allyl ethyl carbodiimide may be separated from impurities by gas-liquid chromatographic purification. In a first purification allyl ethyl carbodiimide may be still contaminated with allyl isothiocyanate but separated from other impurities. Allyl isothiocyanate impurity may then be removed and isolated in a second gas-liquid chromatographic purification.

Example 4.—Preparation of diallyl carbodiimide

One molecular proportion of bis (tributyltin) oxide and 1.05 molecular proportions of allyl isothiocyanate may be admixed. Heat may begin to evolve from the reaction mixture after a few minutes. The reaction mixture may then be left for about 16 hours and then heated to 100° C. at 90 mm. pressure for 7 hours when solid polymerized diallyl carbodiimide precipitates. Monomeric diallyl carbodiimide may be recovered in 10% yield by distillation and identified by infrared spectrum, gas-liquid chromatography and mass spectrometry (molecular weight 121.08).

Although this invention has been disclosed by reference to various specific examples, it will be apparent to those skilled-in-the-art that various modifications and changes may be made thereto which fall within the scope of this invention.

I claim:

1. A process for preparing organic carbodiimide of the the formula R′—N=C=N—R′ wherein each R′ is independently selected from the group consisting of unsubstituted and substituted alkyl, aryl, and alkenyl groups wherein the substituents are selected from the group consisting of alkyl, aryl, cycloalkyl, alkaryl, alkenyl, ether, and halogen which comprises reacting bis(triorganotin) oxide, $(R_3Sn)_2O$, wherein R is a hydrocarbon group with at least an equimolar amount of organic isothicyanate thereby forming organic carbodiimide containing the organic group of said organic isothiocyanate; and recovering said organic carbodiimide.

2. A process for preparing organic carbodiimide as claimed in claim 1 wherein said bis(tributyltin) oxide and said isothiocyanate are reacted at a temperature of 0° C. –100° C.

3. A process for preparing organic carbodiimide as claimed in claim 1, wherein said bis(triorganotin) oxide is bis(tributyltin) oxide.

4. A process for preparing organic carbodiimide as claimed in claim 1 wherein said organic isothiocyanate is allyl isothiocyanate.

5. A process for preparing organic carbodiimide of the formula R′—N=C=N—R′ wherein R′ is independently selected from the group consisting of unsubstituted and substituted alkyl, aryl, and alkenyl groups wherein in substituents are selected from the group consisting of alkyl, aryl, cycloalkyl, alkaryl, alkenyl, ether, and halogen which comprises reacting organic isocyanate with at least an equimolar amount of bis(triorganotin oxide), $(R_3Sn)_2O$, wherein R is a hydrocarbon group thereby forming bis(triorganotin) oxide-isocyanate adduct; reacting said bis(triorganotin) oxide isocyanate adduct with at least an equimolar amount of organic isothiocyanate thereby forming organic carbodiimide containing the organic groups of said organic isocyanate and of said organic isothiocyanate; and recovering said organic carbodiimide.

6. A process for preparing organic carbodiimide as claimed in claim 5 wherein said bis(triorganotin) oxide-isocyanate adduct and said organic isothiocyanate are reacted at a temperature of 25°–150° C.

7. A process for preparing organic carbodiimide as claimed in claim 5 wherein said bis(triorganotin) oxide is bis(tributyltin) oxide.

8. A process for preparing organic carbodiimide as claimed in claim 5 wherein said organic isocyanate is phenyl isocyanate and said organic isothiocyanate is phenyl isothiocyanate.

9. A process for preparing organic carbodiimide as claimed in claim 5 wherein said organic isocyanate is ethyl isocyanate and said organic isothiocyanate is phenyl isothiocyanate.

10. A process for preparing organic carbodiimide as claimed in claim 5 wherein said organic isocyanate is ethyl isocyanate and said organic isothiocyanate is allyl isothiocyanate.

References Cited

UNITED STATES PATENTS 3,157,662  11/1964  Smeltz _____ 260—551
3,108,138  10/1963  Seefelder et al. _____ 260—551

HENRY R. JILES, *Primary Examiner.*

H. I. MOATZ, *Assistant Examiner.*

U.S. Cl. X.R.

260—429.7